J. A. OATSDEAN.
TRACTION DEVICE FOR MOTOR VEHICLES.
APPLICATION FILED JAN. 20, 1919.
1,319,018.
Patented Oct. 14, 1919.
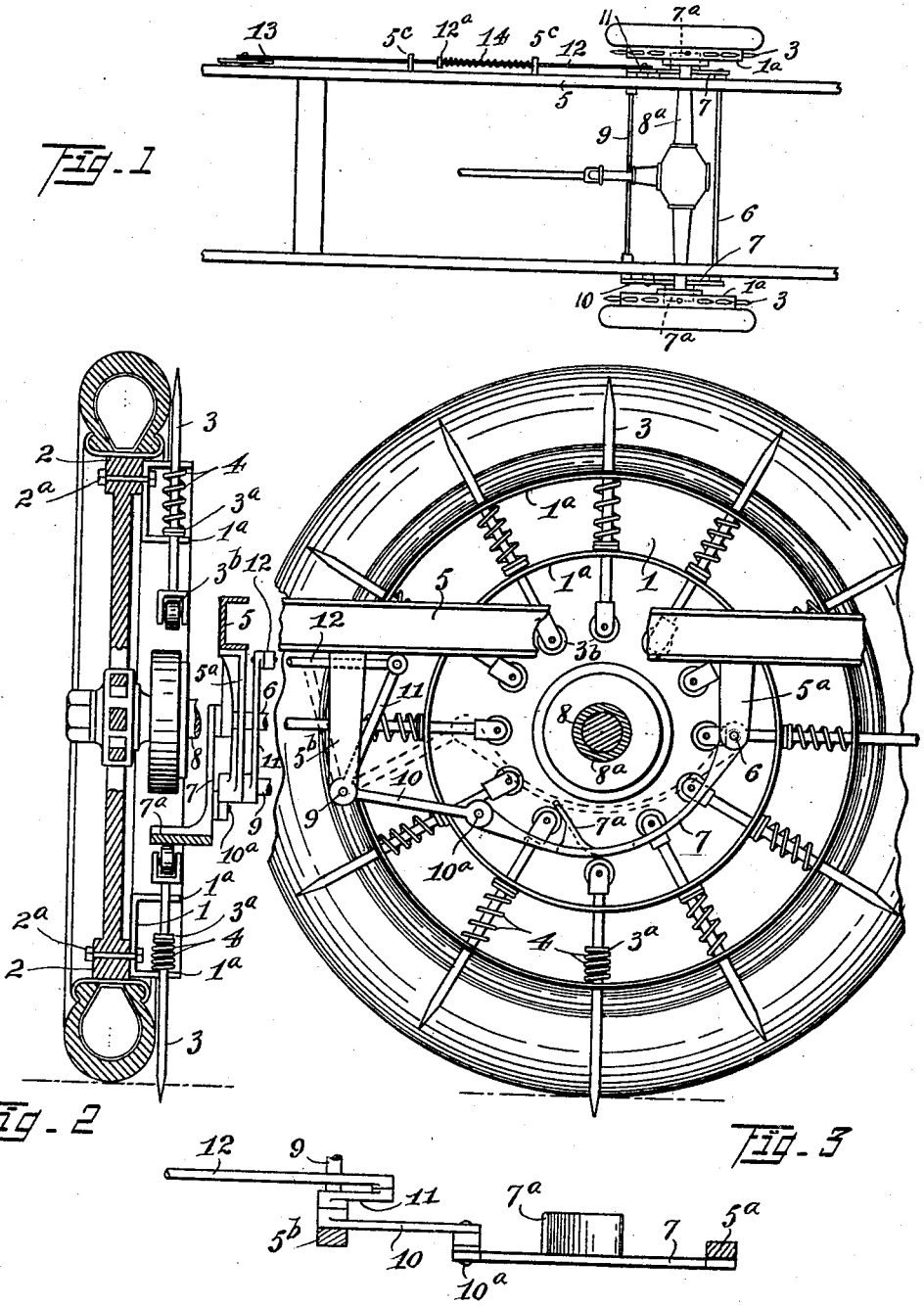

UNITED STATES PATENT OFFICE.

JOHN A. OATSDEAN, OF CLEVELAND, OHIO, ASSIGNOR OF ONE-THIRD TO CHARLES A. OATSDEAN, OF McDONALD, OHIO.

TRACTION DEVICE FOR MOTOR-VEHICLES.

1,319,018. Specification of Letters Patent. Patented Oct. 14, 1919.

Application filed January 20, 1919. Serial No. 272,012.

*To all whom it may concern:*

Be it known that I, JOHN A. OATSDEAN, a citizen of the United States, residing at Cleveland, in the county of Cuyahoga and State of Ohio, have invented certain new and useful Improvements in Traction Devices for Motor-Vehicles, of which the following is a specification.

My invention relates to improvements in traction devices for motor vehicles, and more particularly to that class or type designated to be attached to the inner sides of the driving or traction wheels and adapted to be thrown into and out of operative tractive position while the motor vehicle is in motion.

The primary object of the invention is to provide a generally improved device of this class which will be exceedingly simple in construction, cheap of manufacture and efficient in use.

A further object of the invention is the provision of a device of this class which may be readily and quickly attached to or detached from any ordinary driving or traction wheel of a motor vehicle, and when in use will not be liable to damage or disarrangement of the parts.

A still further object of the invention is the provision of improved operating and controlling mechanism normally held in an inoperative position, whereby the traction members are normally held out of operative position or within the circumference of the tread of the driving or traction wheel, and whereby upon the operation of such operating and controlling device by the driver or chauffeur of the vehicle, traction devices are projected beyond the periphery or tread portion of the traction wheel to engage the traction or road surface at the lower or traction engaging portion of the wheel during the rotation of the latter.

With the above mentioned and other ends in view, the invention consists in the novel construction, arrangement, and combination of parts, hereinafter described, illustrated in one of its embodiments, in the accompanying drawings, and particularly pointed out in the appended claim.

Referring to the drawings, forming a part of this specification, Figure 1, is a top plan view of a motor vehicle chassis, the rear or traction wheels thereof being equipped with the improved traction device, and illustrating in particular the hand lever mechanism for bringing the same into and out of operation.

Fig. 2, an enlarged central vertical sectional view of one of the driving or traction wheels equipped with the improved device, the parts being shown in their operative position, whereby the radially movable traction members or bars are projected into engagement with the traction or road surface at the lower or tread portion of the traction wheel during the revolution of the latter.

Fig. 3, a side elevation of the same.

Fig. 4, a top plan view of one of the friction shoes below the axis of the driving or traction wheel for engaging or projecting the traction members or bars and projecting the latter beyond the tread of the traction wheel or tire, and into engagement with the traction surface or roadway during the rotation of the traction wheel.

Similar numerals of reference designate like parts throughout all the figures of the drawings.

The improved anti-skidding or traction device comprises an attaching and supporting member 1, preferably in the form of a disk or ring member, adapted to be attached to or detached from an ordinary wheel felly 2, by means of a plurality of attaching bolts 2ª, said supporting disk or ring member 1, being provided with lateral flanges 1ª, provided with a plurality of openings adapted to receive and contain a series of radially extending traction members or bars 3.

As a means of resisting the projecting movements of the traction members or bars 3, when operated by the mechanism hereinafter described, and also as a means of returning such traction members or bars 3, after being so actuated and normally holding the same in their inoperative or retracted positions, each traction member or bar 3, is provided with a coiled compression spring 4, interposed between the outer flange 1ª, and the stop members 3ª, on the traction members or bars 3, said stop members 3ª, normally abutting against the inner flange 1ª, and thereby holding the members 3, a fixed distance from the outer periphery or tread surface of the wheel.

As a means of simultaneously causing the traction members 3, to be projected into contact with the traction surface or roadway at the lower or traction engaging portions of the wheels as the latter revolve, each chassis side member 5, is provided with a depending bracket 5ª, carrying a rock-shaft 6, upon which is mounted a pair of friction shoes 7, each shoe 7, extending forwardly and below the wheel driving axle 8, and axle housing 8ª, each of said friction shoes being provided with a laterally extending cam shaped projection 7ª, adapted to be moved into and out of the path of travel of the friction rollers 3ᵇ, carried at the inner ends of the traction members 3, when operated by the operating and controlling mechanism, hereinafter described.

As a means of simultaneously actuating or raising and lowering the friction shoes 7, each chassis side frame is provided with a depending bracket 5ᵇ, carrying a rock-shaft 9, said rock-shaft 9, being provided at its ends with lever arms 10, pivotally connected to the free or movable ends of the friction shoes 7, by means of pivot members 10ª. As a means of actuating the rock-shaft 9, the latter is provided with an upwardly extending lever arm 11, connected to a horizontally extending rod 12, mounted, in the present instance, in guide brackets 5ᶜ, on one of the chassis side members, and being connected to an operating lever 13, within convenient reach of the driver or chauffeur of the motor vehicle. As a means of normally holding the friction shoes 7, in an inoperative position or out of the path of the friction rollers 3ᵇ, as shown in dotted lines in Fig. 3, of the drawings, whereby said traction members 3, will not be brought into projecting and retracting action, the rod 12, is provided with a surrounding coiled compression spring 14, abutting against one of the guide brackets 5ᶜ, and an adjustable block 12ª, on the rod 12, it being obvious that the tension of the spring 14, may be readily adjusted by adjusting the adjustable block 12ª.

From the foregoing description, taken in connection with the accompanying drawings, the operation and advantages of my invention will be readily understood.

Having thus described one of the embodiments of my invention, what I claim and desire to secure by Letters Patent, is:—

In a traction device for motor vehicles, the combination with a pair of traction wheels provided with radially movable traction bars, and the chassis of a motor vehicle; of a rock shaft mounted on said chassis and provided with friction shoes extending beneath the axle portions of said traction wheels and adapted to be moved into and out of the path of said traction bars, a rock shaft on said chassis provided with arms pivotally connected to said friction shoes and adapted to move the latter into the path of said traction members whereby the latter are pressed into engagement with the traction surface during the rotation of the traction wheels, a crank arm on said rock shaft at one side of said chassis, an operating rod connected to said crank arm of said rock shaft, a spring normally holding said rod and rock shaft and shoes out of the path of said traction members, and an operating lever for operating said rod against the resistance of said spring.

In testimony whereof I have affixed my signature.

JOHN A. OATSDEAN.

Copies of this patent may be obtained for five cents each, by addressing the "Commissioner of Patents, Washington, D. C."